United States Patent [19]

Ruhaut

[11] Patent Number: 4,979,614
[45] Date of Patent: Dec. 25, 1990

[54] STORAGE CONTAINER FOR AN ARTICLE

[76] Inventor: Robert C. Ruhaut, 64 DeMott Ave., Clifton, N.J. 07011

[21] Appl. No.: 429,510

[22] Filed: Oct. 31, 1989

[51] Int. Cl.$^5$ ............................................. B65D 85/16
[52] U.S. Cl. .................................... 206/328; 174/135; 206/388; 248/205.2
[58] Field of Search ................ 174/135; 206/328, 329, 206/388; 248/205.2

[56] References Cited

U.S. PATENT DOCUMENTS

| 982,651 | 1/1911 | Wellman . | |
|---|---|---|---|
| 2,160,961 | 6/1939 | Dorman | 174/135 |
| 2,253,974 | 8/1941 | Guild . | |
| 2,351,379 | 6/1944 | Wehringer | 174/135 |
| 2,859,776 | 11/1958 | McKenzie et al. | 206/525 |
| 2,872,032 | 2/1959 | West | 206/329 |
| 3,008,571 | 11/1961 | Bond . | |
| 3,068,316 | 12/1962 | Witt . | |
| 3,089,210 | 5/1963 | Ritter | 174/135 |
| 3,310,623 | 3/1967 | Vaughan . | |
| 3,337,682 | 8/1967 | Swett . | |
| 3,520,988 | 7/1970 | Ballock . | |
| 3,576,304 | 4/1971 | Gillemot et al. . | |
| 3,612,426 | 10/1971 | Germock . | |
| 3,796,304 | 3/1974 | Blais | 206/388 |
| 3,913,587 | 10/1975 | Newash | 174/135 |
| 4,037,720 | 7/1977 | McGurk | 174/135 |
| 4,475,649 | 10/1984 | Haarbosch | 206/328 |
| 4,548,375 | 10/1985 | Moss | 248/205.2 |

FOREIGN PATENT DOCUMENTS

| 0084919 | 1/1958 | Denmark . | |
| 0101042 | 2/1965 | Denmark . | |
| 1399091 | 6/1975 | United Kingdom | 206/388 |

Primary Examiner—Jimmy G. Foster

[57] ABSTRACT

A holder for storing an umbrella or selective lengths of a cord for effectively reducing the length thereof while permitting lengthening thereof when desired. The holder includes a hollow container open at both ends and adapted to receive a cord folded in multiple loops within the hollow container. A retaining member is disposed within the hollow container for retaining multiple loops of a cord within the hollow container by engaging an outer surface of a portion of the multiple loops. Manually folding a cord to include multiple loops and inserting the multiple loops within the hollow container retains the cord within the hollow container to define a predetermined distance between end portions of a cord.

3 Claims, 5 Drawing Sheets

U.S. Patent    Dec. 25, 1990    Sheet 1 of 5    4,979,614
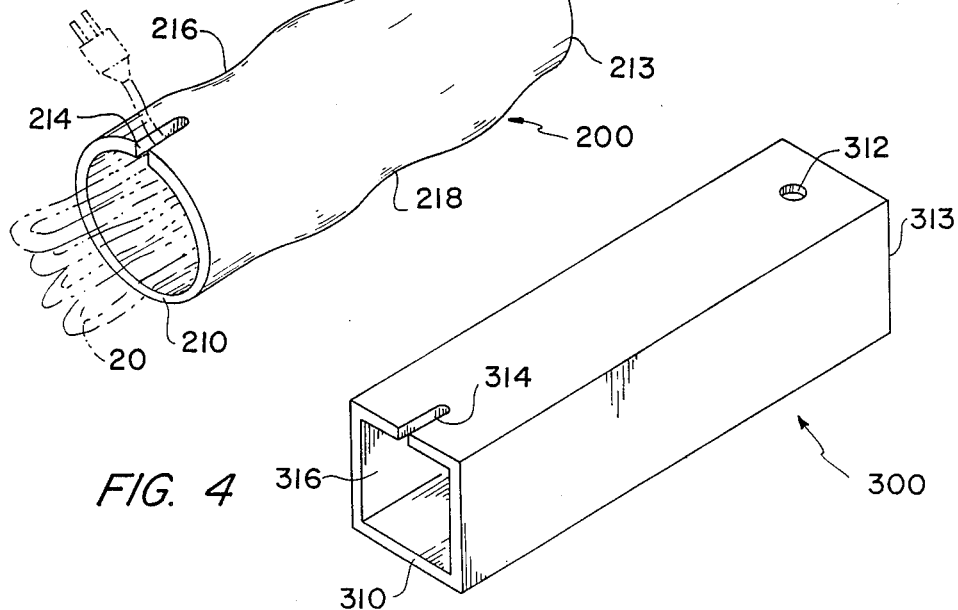

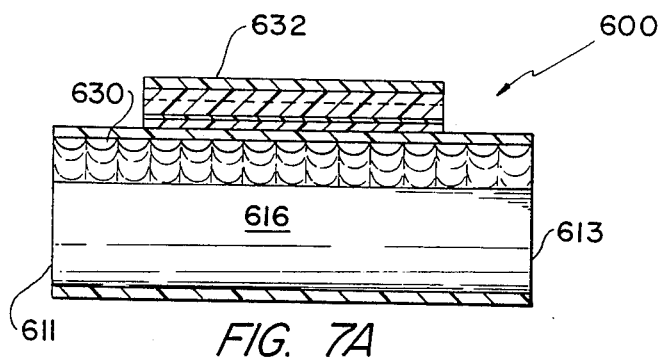
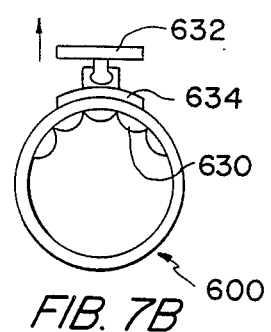
FIG. 7A  FIG. 7B
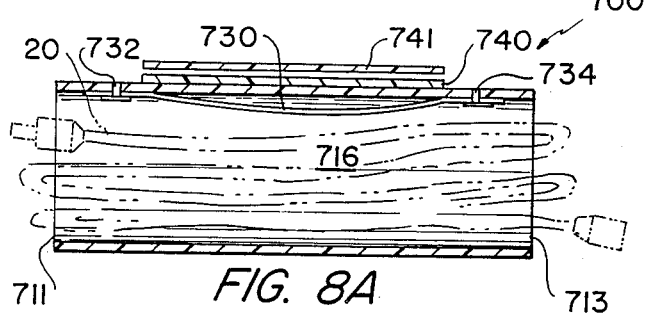
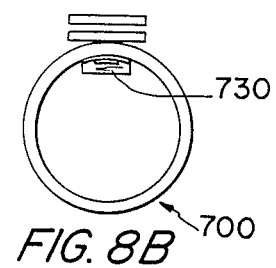
FIG. 8A  FIG. 8B
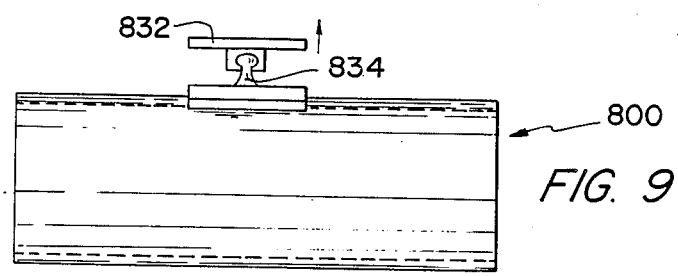
FIG. 9
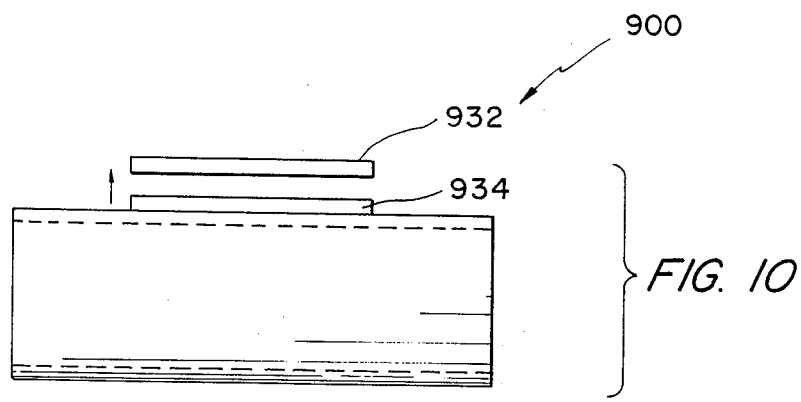
FIG. 10

STORAGE CONTAINER FOR AN ARTICLE

BACKGROUND OF THE INVENTION

1. Field of the Invention

The present invention relates to a holder for storing an article such as selective lengths of a cord for effectively reducing the length thereof while permitting lengthening of the cord when desired. In addition, the holder may be used to store an umbrella.

2. Description of Background Art

Holders for retaining and storing electrical cords are disclosed in a number of prior art patents. The devices include a groove or slot for engaging the cord adjacent to a corner of a holder.

SUMMARY AND OBJECTS OF THE INVENTION

It is an object of the present invention to provide a holder for storing selective lengths of a cord wherein multiple loops are disposed within a hollow container.

It is an object of the present invention to provide a holder for storing an umbrella.

It is another object of the present invention to provide a retaining member which is disposed within the hollow container for retaining the multiple loops of a cord within the hollow container by engaging an outer surface of a portion of the multiple loops.

A further object of the present invention is to provide a twisted hollow container wherein the interior wall surface of the twisted hollow container frictionally engages the multiple loops of a cord disposed therein.

A still further object of the present invention is to provide a resilient member mounted within the hollow container for frictionally engaging multiple loops of a cord disposed therein.

A still further object of the present invention is to provide a leaf spring or a plurality of bellows mounted within the hollow container for applying pressure to the multiple loops of the cord disposed therein.

Another object of the present invention is to provide a notch disposed in one end of the hollow container for securing an end of a cord disposed within relative to the one end of the hollow container.

Another object of the present invention is to provide an aperture, Velcro or a hook for permitting the hollow container to be mounted relative to a wall surface.

A still further object of the present invention is to provide a light bulb mounted on one end of the hollow container and a holder mounted on an outer circumferential surface of the hollow container wherein an electrical cord disposed within the hollow container may be utilized for supplying electrical power to the light bulb.

These and further objects of the present invention are achieved by providing a holder for storing an umbrella or for storing selective lengths of a cord for effectively reducing the length thereof while permitting lengthening thereof when desired. A hollow container is open at both ends and adapted to receive an umbrella or a cord folded in multiple loops within the hollow container. A retaining member is disposed within the hollow container for retaining the umbrella or the multiple loops of a cord within the hollow container by engaging an outer surface of a portion of the multiple loops. Manually folding a cord to include multiple loops and inserting the multiple loops within the hollow container retains the cord within the hollow container to define a predetermined distance between end portions of a cord.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a perspective view showing a first embodiment of the present invention;

FIG. 2 is a perspective view showing a second embodiment of the present invention wherein one surface thereof includes a flat portion;

FIG. 3 is a third embodiment of the present invention wherein a twisted hollow container is provided;

FIG. 4 is a fourth embodiment of the present invention wherein the hollow container is either square or rectangular in cross section;

FIG. 7A is a cross-sectional view illustrating a plurality of bellows disposed on an interior portion of the hollow container;

FIG. 7B is a cross-sectional view of the hollow container illustrated in FIG. 7A;

FIG. 8A is a cross-sectional view illustrating a leaf spring disposed on an interior portion of the hollow container and a Velcro fastener affixed to the outer portion;

FIG. 8B is a cross-sectional view of the embodiment illustrated in FIG. 8A;

FIG. 9 is a side view of a hollow container having a projection and mounting member for securing the hollow container to a wall surface;

FIG. 10 is a side elevational view of a hollow container including a magnet affixed to the container and a second magnet for mounting the hollow container relative to a wall surface;

DETAILED DESCRIPTION OF THE PREFERRED EMBODIMENTS

Figure 5:
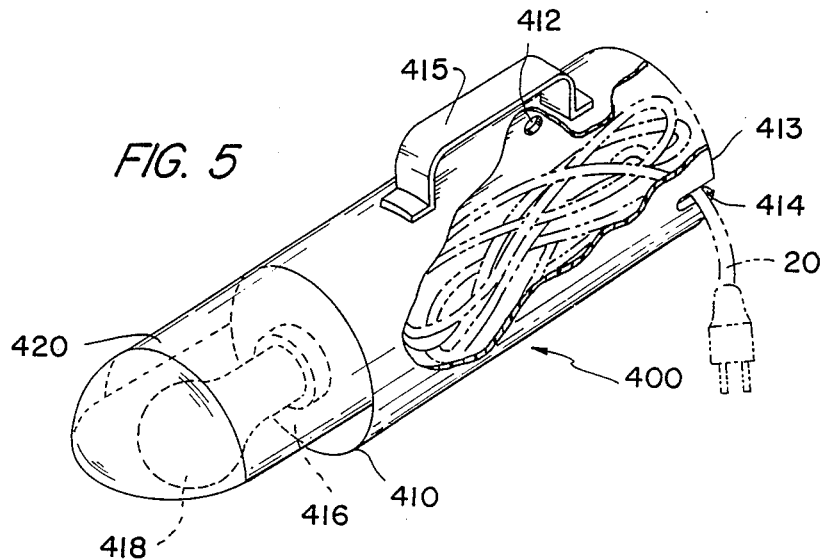
FIG. 5 is a fifth embodiment of the present invention wherein a light bulb is secured to one end of the hollow container.

FIG. 1 is a perspective view of a first embodiment of the present invention. A hollow container 10 includes a first end 11 and a second end 13. A notch 14 is disposed adjacent to the first end 11. An aperture 12 is disposed adjacent to the second end 13 of the hollow container 10. A cord is designed to be disposed in a plurality of loops within the interior portion 16 of the hollow container 10. One end of an electrical cord may be secured within the notch 14 so as to releasably retain the end of the electrical cord relative to the one end 11 of the hollow container 10.

FIG. 2 is a perspective view of a second embodiment of the present invention illustrating a hollow container 100. The hollow container 100 includes a first end 110 and a second end 113. A notch 114 is disposed at the first end 110. An aperture 112 is disposed adjacent to the second end 113. A flat surface 115 extends from the first end 110 to the second end 113. The flat surface 115 is designed to permit the hollow container 100 to be affixed relative to a wall surface.

FIG. 3 illustrates a third embodiment of the present invention. A hollow container 200 is provided with a first end 210 and a second end 213. A notch 214 is disposed adjacent to the first end 210. An aperture 212 is disposed adjacent to the second end 213. The surface of the hollow container 200 is a twisted surface including indentations 216, 217, 218 disposed along the length thereof. The indentations 216, 217 and 218 are designed within the interior portion of the hollow container 200 so as to retain the electrical cord 20 within the interior portion of the hollow container 200. One end 21 of the electrical cord 20 may be disposed within the notch 214 so as to secure the electrical cord 20 relative to the hollow container 200.

FIG. 4 illustrates a fourth embodiment of the present invention. A hollow container 300 is provided with a first end 310 and a second end 313. A notch 314 is disposed adjacent to the first end 310. An aperture 312 is disposed adjacent to the second end 313. A plurality of loops of an electrical cord may be positioned within the interior portion 216 of the hollow container 300.

FIG. 5 is a fifth embodiment of the present invention. A hollow container 400 includes a first end 410 and a second end 413. A notch 414 is disposed adjacent to the second end 413. An aperture 412 is disposed adjacent to the second end 413. A handle 415 is mounted on an outer surface of the hollow container 400. An electrical fixture 416 is secured to a first end 410 of the hollow container 400. An electrical bulb 418 is designed to be secured to the electrical fixture 416. A cover 420 is designed to be mounted around the electrical bulb 418 so as to protect the electrical bulb during use. An electrical cord 20 is designed to be positioned within the hollow container 400. One end of the electrical cord 20 may be secured within the notch 414 so as to releasably retain the electrical cord 20 relative to the hollow container 400.

Figure 6:
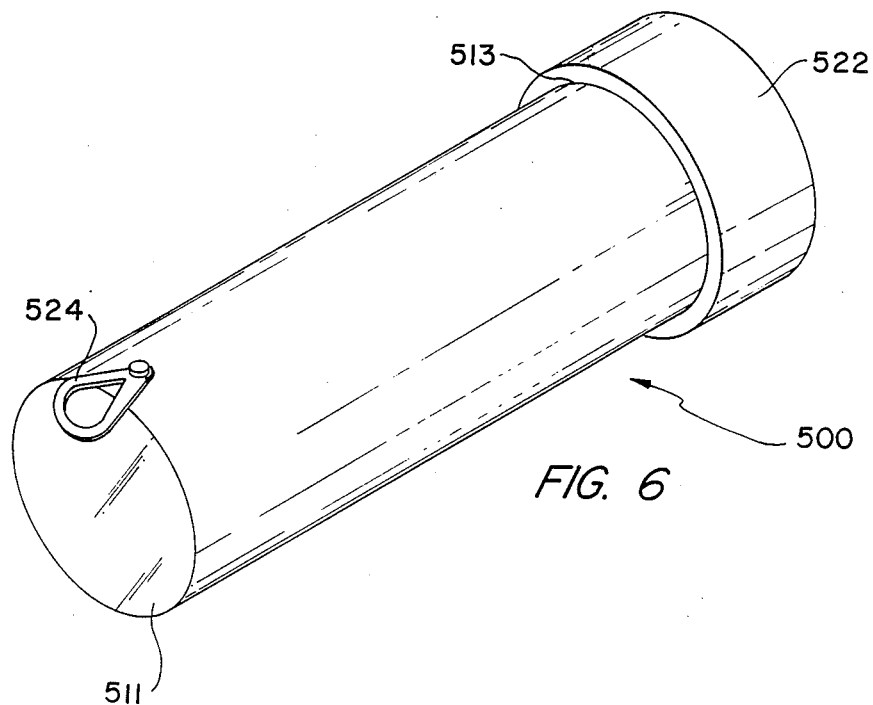
FIG. 6 is a sixth embodiment of the present invention wherein a cover is secured to one end of the hollow container.

FIG. 6 is a perspective view of a sixth embodiment of the present invention. A hollow container 500 includes a first end 511 and a second end 513. A cover 522 is disposed on the second end 513. A hook 524 is secured to the first end 511. An electrical cord may be disposed within the hollow container for shipment. The hook 524 may be utilized to retain the hollow container 500 relative to a wall surface.

FIGS. 7A and 7B illustrate a container 600 which includes a first end 611 and a second end 613. A plurality of bellows 630 are mounted within an interior surface 616. The plurality of bellows 630 form retaining means mounted within the interior portion of the container 600. The retaining means is designed to engage an outer surface of a portion of the multiple loop electrical cord when the electrical cord is disposed within the hollow container 600. A mounting member 632, 634 is designed to include a first member 634 secured to an outer surface of the hollow container 600. The mounting member 632, 634 is designed for securing the hollow container 600 relative to a wall surface.

FIGS. 8A and 8B illustrate another embodiment of the present invention. A hollow container 700 includes a first end 711 and a second end 713. A resilient member 730 is disposed within an interior portion 716 of the hollow container 700. The resilient member 730 may be a leaf spring which acts a retainer means for retaining multiple loops of a cord 20 within the hollow container 700 by engaging an outer surface of a portion of the multiple loops of the cord 20. The resilient member 730 is secured to the hollow container 700 by means of fasteners 732, 734. A mounting member 740, 741 includes Velcro affixed to engaging portions and is designed for securing the hollow container 700 relative to a wall surface.

FIG. 9 is another embodiment of the present invention wherein a container 800 includes a mounting member 832, 834 affixed to an outer peripheral surface thereof. The embodiment of the present invention, as illustrated in FIG. 9, provides a male member 834 affixed to the hollow container 800. The mounting member 832 is a female member designed to be secured to a wall surface.

FIG. 10 is a perspective view of another embodiment of the present invention. A hollow container 900 includes a magnetic member 934 secured to an outer surface thereof. A second magnetic member 932 is designed to mate with the magnetic member 934 and to secure the container 900 relative to a wall surface.

Figure 11:
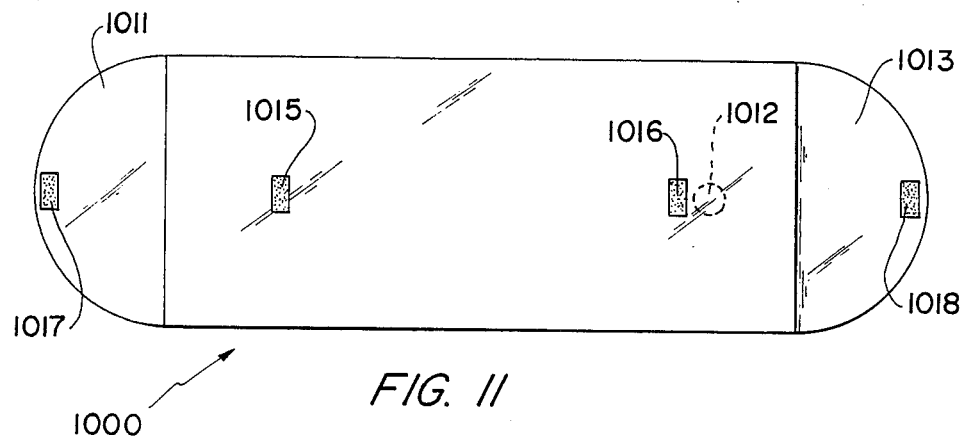
FIG. 11 is a top plan view of an envelope according to another embodiment of the present invention.
Figure 12:
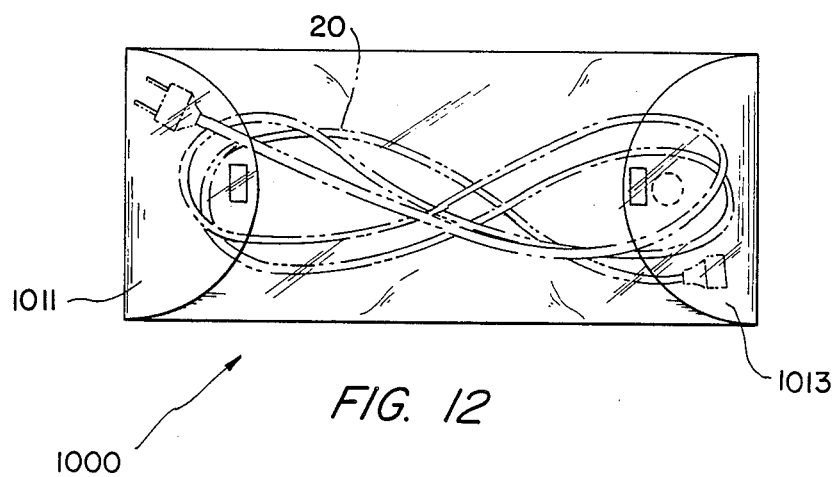
FIG. 12 is a top plan view of an envelope including an electrical cord shown in phantom lines disposed therein.

FIGS. 11 and 12 illustrate another embodiment of the present invention wherein a container 1000 is designed to include a first flap 1011 and a second flap 1013. A Velcro fastener 1015, 1016 is secured to a top surface of the container 1000. Similarly, a Velcro fastener 1017, 1018 is secured to the closure flaps 1011, 1013, respectively. An aperture 1012 is disposed in the container 1000 for securing the container 1000 relative to a wall surface. As illustrated in FIG. 12, a cord 20 may be disposed within the container 1000 and the first flap 1011 and the second flap 1013 closed so as to form a mailing package for the electric cord 20.

In operation, an electrical cord 20 is manually folded to include multiple loops. The multiple loops are inserted within a hollow container to retain the cord within the hollow container to define a predetermined distance between end portions of the cord 20. The hollow container includes a first end and a second end. A retaining member is disposed within the hollow container for retaining the multiple loops of an electrical cord 20 within the hollow container by engaging an outer surface of a portion of the multiple loops. In this way, a holder for storing selective lengths of a cord 20 for effectively reducing the length thereof, while permitting lengthening thereof when desired, is provided.

Figure 13:
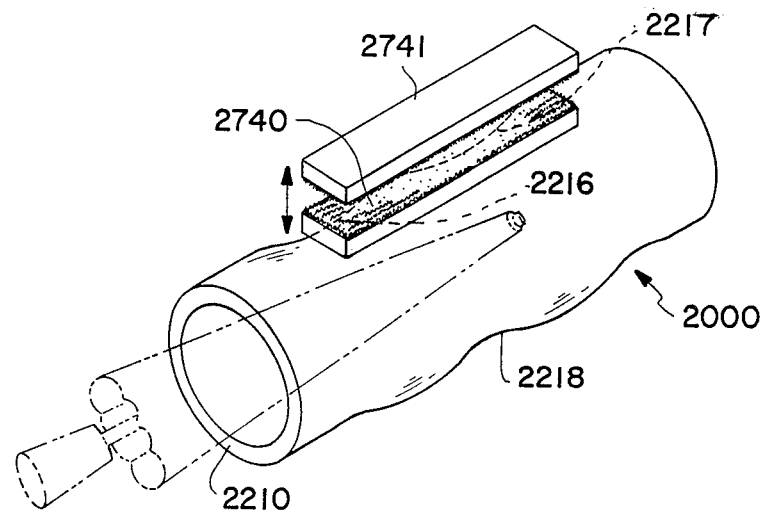
FIG. 13 is a perspective view showing an embodiment of the present invention wherein an umbrella is adapted to be inserted into the holder having a Velcro fastener affixed to an outer portion.

FIG. 13 is a perspective view of another embodiment of the present invention wherein a holder 2000 is adapted to retain an umbrella 2001 therein. The holder 2000 includes a first end 2210 and a second end 2213. The surface of the holder 2000 is a twisted surface including indentations 3216, 3217, 3218 disposed along the length thereof. The indentations 3216, 3217 and 3218 are designed within the interior portion of the holder 2000 so as to retain an umbrella 2001 within the interior portion. A mounting member 2740 is designed to be secured to an outer surface of the holder 2000. A mounting member 2741 is designed to be secured to a wall surface. Velcro is applied to adjoining surfaces of the mounting member 2740, 2741 for securing the holder 2000 relative to a wall surface, the interior of an automobile or any other location wherein an umbrella 2001 may be desired.

Figure 14:
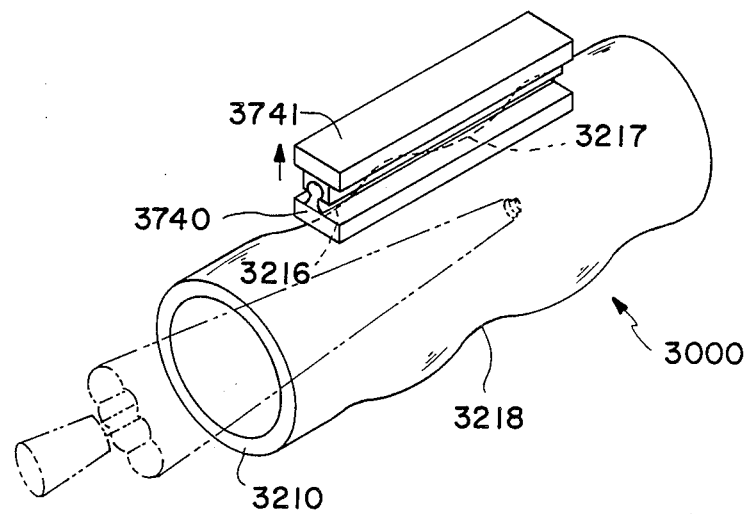
FIG. 14 is a perspective view showing an embodiment of the present invention wherein an umbrella is adapted to be inserted into the holder having a snap fastener affixed to an outer portion thereof.

FIG. 14 is a perspective view of another embodiment of the present invention wherein a holder 3000 is adapted to retain an umbrella 3001 therein. The holder 3000 includes a first end 3210 and a second end 3213. The surface of the holder 3000 is a twisted surface including indentations 3216, 3217, 3218 disposed along the length thereof. The indentations 3216, 3217 and 3218 are designed within the interior portion of the holder 3000 so as to retain an umbrella 3001 within the interior portion. A male snap member 3740 is designed to be secured to an outer surface of the holder 3000. A female snap member 3741 is designed to be secured to a wall surface, the interior of an automobile or any other location wherein an umbrella 3001 may be desired.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A holder for storing selective lengths of a cord for effectively reducing the length thereof while permitting lengthening thereof when desired, said holder comprising:
   a hollow container open at both ends and adapted to receive a cord folded in multiple loops within the hollow container; and
   a spring member mounted within said hollow container for applying pressure to multiple loops of a cord disposed within said hollow container by engaging an outer surface of a portion of the multiple loops;
   wherein manually folding a cord to include multiple loops and inserting the multiple loops within the hollow container retains a cord within the hollow container to define a predetermined distance between end portions of a cord.

2. The holder for storing selective lengths of a cord according to claim 1, and further including Velcro affixed to an outer circumferential surface of said hollow container and a Velcro mounting member adapted to engage said Velcro affixed to said hollow container for mounting said hollow container relative to a wall surface.

3. The holder for storing selective lengths of a cord according to claim 1, wherein said spring member is a leaf spring.

* * * * *